United States Patent Office 3,213,022
Patented Oct. 19, 1965

3,213,022
LUBRICANTS CONTAINING METAL PHOSPHORODITHIOATE-EPOXIDE REACTION PRODUCTS
Thomas Robert Hopkins, Merriam, Kans., and Arthur N. Arakelian, Cleveland, and Alan Rhodes, Willoughby, Ohio, assignors to The Lubrizol Corporation, Wickliffe, Ohio, a corporation of Ohio
No Drawing. Filed Mar. 11, 1963, Ser. No. 264,031
4 Claims. (Cl. 252—32.7)

This is a continuation-in-part of copending application Serial No. 484,556, filed January 27, 1955 and now abandoned.

This invention relates as indicated to certain phosphorus thioic acid derivatives and to a process for the preparation thereof. In a more particular consideration, the invention relates to reaction products obtained from metal salts of organic phosphorus thioic acids.

The products of the hereindescribed process are useful as additives for lubricants, especially for gear lubricants.

It is a principal object of the present invention to provide new compositions of matter.

It is also an object of the present invention to provide a novel process for the preparation of the above compositions of matter.

It is still a further object of the invention to provide novel additives for lubricants.

These and other objects are accomplished by a process which comprises the reaction of a metal salt of a phosphorus thioic acid having the structure

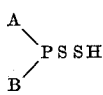

where A and B are the same or different radicals having from 1 to about 30 carbon atoms and are selected from the class consisting of RO, RS, HS, and HO, at least one of A and B being an organic radical, said metal being selected from the class consisting of lead, aluminum, molybdenum, and cadmium, with at least about 0.5 equivalent of an organic epoxide.

The organic radicals in the above structure are preferably non-functional, which is to say that they do not take part in or have any significant influence upon the reaction of the process. Such organic radicals, A and B, may be selected from the radicals RS and R'S or RO and R'O. Thus the phosphorus thioic acid may be the following:

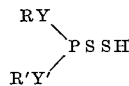

where R and R' are the same or different organic radicals, each bound to the rest of the molecule through a carbon atom and Y and Y' are the same or different and are selected from the class consisting of oxygen and sulfur. R and R' may be aliphatic, cycloaliphatic, or aromatic, and may contain organic or inorganic substituents. Illustrative types of organic radicals include alkyl, cycloalkyl, aryl, aralkyl, alkaryl, alkenyl, cyclokenyl, etc. and the substituted derivatives of these; e.g., nitro-, halo-, hydroxy-, carboxy-, etc. Thus suitable organic radicals would include; e.g., methyl, ethyl, n-propyl, isopropyl, n-butyl, isobutyl, amyl, isoamyl, n-hexyl, 4-methyl-2-pentyl, cyclohexyl, chlorocyclohexyl, methylcyclohexyl, heptyl, n-octyl, tert-octyl, nonyl lauryl, cetyl, phenyl, bromophenyl, nitro-phenyl, ethyl-phenyl, propyl-phenyl, butyl-phenyl, amyl-phenyl, benzyl, phenethyl, allyl, octenyl, cyclohexenyl, etc.

The phosphorodithioic acids may be prepared by the reaction of phosphorus pentasulfide with the hydroxy compound which corresponds to the organic radicals R and R'. This reaction is illustrated by the action of phosphorus pentasulfide on ethyl alcohol to produce O,O-diethyl phosphorodithioic acid.

Metal salts of the above phosphorus dithioic acids may be prepared quite conveniently by treating the particular acid with a metal oxide or hydroxide. Thus, the lead salt of a phosphorodithioic acid may be prepared from the acid by reaction with lead oxide.

The organic epoxides may be represented as having the structural grouping

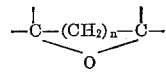

where $n$ is 0 or 1. Those epoxides are preferred in which one of the carbon atoms attached to O is attached also to two hydrogen atoms. In other words, the preferred compounds are terminal epoxides and have the structural grouping

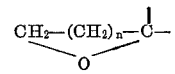

where $n$ is 0 or 1. These have been given the name terminal epoxides because they may be thought of as being derived in most instances from a vinyl compound or one which has a terminal olefinic double bond.

Specific examples of suitable epoxides include ethylene oxide, propylene oxide, 1-butene oxide, butadiene monoxide, 1-amylene oxide, styrene oxide, trimethylene oxide, 9,10-epoxystearic acid, etc.

The reaction of organic epoxides with metal salts of phosphorus dithioic acids is in some cases an exothermic reaction which may be carried out conveniently within the temperature range of 0–200° C. In those cases in which the reaction is exothermic, the exothermic nature of the reaction usually is such that the temperature of the reaction can be controlled within this range without the application of any external heating, by adding the organic epoxide portionwise to the salt of the phosphorus dithioic acid. Although it is not necessary, it is preferred to control the temperature so that it is reasonably constant throughout the course of the reaction. It is particularly preferred to control the temperature wthin the range of 50–100° C.

The reaction may be carried out in the presence or absence of a mutual solvent for the organic epoxide and the metal salt of the phosphorus dithioic acid. If a solvent is used, it should be one which is inert towards both reactants such as, e.g., petroleum ether, kerosene, light and heavy mineral oils, benzene, toluene, xylene, ortho-dichlorobenzene, carbon tetrachloride, etc. Since metal salts of phosphorus dithioic acids are often prepared as solutions in such inert solvents, these solutions may be conveniently used for reaction with the organic epoxide.

Neither the mechanism by which the reaction proceeds nor the identity of the products which are formed thereby are known or understood. It appears that the reaction involves the addition of the epoxide to the phosphorus thioic acid salt rather than a condensation of the two molecules. It appears that the preferred reaction involves equivalent amounts of the metal salt and the epoxide; e.g., one equivalent of a metal phosphorodithioate reacting with one equivalent of an epoxide. Something more than a mere addition reaction must take place, however, since it appears that the product is not a metal salt. This is borne out by a comparison of some of its reactions with similar reactions of the corresponding metal phosphorus thioate from which it is prepared. Thus the organic portion of the metal salt which is the starting material is not affected by treatment with alcoholic hydrochloric acid, whereas in the case of its epoxide reaction product the organic portion thereof is rather completely decomposed by such treatment. In this case it is evident that some molecular rearrangement is involved in addition to the addition of the two specified reactants. In any case, the exact molecular structure of the product is not known and for this reason the product must be described in terms of the process by which it may be prepared.

The desired products are formed by the reaction of one equivalent of the metal salt with as little as 0.5 equivalent of the epoxide. In some instances, especially where the metal salt is a zinc salt, more than one equivalent of the epoxide may be incorporated in the metal salt. Although the upper limit of the amount of the epoxide capable of reacting with the metal salt is not known, as many as three equivalents of the epoxide may be incorporated into the product. In any event, the use of an excess amount of the epoxide has no adverse effect on the products formed and such use, therefore, is contemplated in this invention. Preferably, from about 0.5 to 1 equivalent of the epoxide is used per equivalent of the metal salt. It will be noted that the equivalent weight of the epoxide is based on the number of the epoxide radicals in a molecule and the equivalent weight of the metal phosphorus thioate is based on the number of the phosphorus thioic acid radicals in a molecule. For instance, the equivalent weight of propylene oxide is its molecular weight; and that of a cadmium phosphorodithioate is one-half its molecular weight.

The metal salts include the following: lead, cadmium, molybdenum and aluminum. The polyvalent metals are preferred because of the greater stability of the products obtained therefrom; and lead is especially preferred.

It should be noted that the product of the reaction of the hereindescribed process is characterized by retention of the metal in its composition. Thus, for example, the reaction product of a lead salt of a phosphorodithioic acid and propylene oxide is characterized by the fact that it contains lead. The lead (or other metal, as the particular case may be) is present in the product in a relatively stable form; it cannot be washed out by aqueous washings.

Other details of the process of invention are illustrated by the following examples.

EXAMPLE 1

To 670 grams (1.0 equivalent) of a 72.5% solution of lead di(2-ethylhexyl) phosphorodithioate in mineral oil at 60° C. there is introduced beneath the surface 58 grams (1.0 equivalent) of propylene oxide. The addition is made over a period of two hours and the temperature maintained at 75–80° C. throughout the period. The resulting mixture is stirred at 75° C. for an additional hour. The reaction is marked by a series of striking color changes from green-brown through a deep green, thence a deep red, and finally to a dark brown. The mixture is filtered and the filtrate shown to have the following analyses: percent phosphorus, 4.2; percent sulfur, 8.8; and percent lead, 12.9.

EXAMPLE 2

A sample of molybdenum di(4-methyl-2-pentyl) phosphorodithioate weighing 180 grams (0.5 equivalent) is treated at room temperature portionwise with 29 grams (0.5 equivalent) of propylene oxide. The addition of propylene oxide requires one hour and causes an overall rise in temperature to 60° C. The mixture is heated for an additional hour at 70° C. and then concentrated by heating to 70° C./25 mm. The residue shows the following analyses: percent phosphorus, 7.4; percent sulfur, 20.0; and percent molybdenum, 7.1.

EXAMPLE 3

To 388 grams (1.0 equivalent) of a 95% solution of cadmium di(4-methyl-2-pentyl) phosphorodithioate in mineral oil there is added at 80–90° C. 58 grams (1.0 equivalent) of propylene oxide. The addition is effected throughout a period of three hours and the resulting mixture is heated to a final temperature of 85° C./10 mm.

The light brown residue shows the following analyses: percent phosphorus, 7.2; percent sulfur, 15.1; and percent cadmium, 13.1.

EXAMPLE 4

To 644 grams (0.78 equivalent) of lead di(4-methyl-2-pentyl) phosphorodithioate heated to 60° C., there is added over a period of 5 minutes, 45 grams (0.78 equivalent) of propylene oxide. The reaction is exothermic and the mixture is maintained at 74° C. for one-half hour and a vacuum of 20 mm. is applied. The mixture is filtered and the filtrate shown to have the following analyses: percent phosphorus, 7.27; percent sulfur, 15.69; and percent lead, 21.24.

EXAMPLE 5

The procedure of Example 3 is repeated except that the cadmium di(4-methyl-2-pentyl) phosphorodithioate is replaced on a chemical equivalent basis with the corresponding aluminum salt.

The metal-containing products of the process are useful as additives for lubricants. As such they impart particularly valuable properties to motor oils and gear lubricants.

The lubricating oils from which the lubricants of this invention may be prepared may be of synthetic, animal, vegetable, or mineral origin. Ordinarily mineral lubricating oils are preferred by reason of their availability, general excellence, and low cost. For certain applications, oils belonging to one of the other three groups may be preferred. For instance, synthetic polyester oils such as didodecyl adipate and di-2-ethylhexyl sebacate are often preferred as jet engine lubricants. Normally the lubricating oils preferred will be fluid oils, ranging in viscosity from about 40 Saybolt Universal Seconds at 100° F. to about 200 Saybolt Universal Seconds at 210° F.

The effectiveness of the additives of this invention to impart load carrying properties to lubricants is shown by the Timken OK Load Test (ASTM Bulletin No. 181 April 1, 1952). In this test the load is noted at which occurs the rupture of a film of the lubricant between the rotating cup and a stationary block and there occurs noticeable surface distress of the stationary block. Thus the higher the load the better the load carrying properties of the lubricant. The results of the test appear in Table I.

*Table I*

| Test Lubricant | Timken OK Load Pound Load (duplicate) |
| --- | --- |
| A. SAE 90 mineral lubricant containing 0.1% of phosphorus as the product of Example 4 | 75, 80 |
| B. SAE 90 mineral lubricant containing 0.1% of phosphorus as the reaction product of zinc dihexylphosphorodithioate with 0.5 equivalent of propylene oxide | 25, 23 |

The use of the hereindescribed phosphorus thioic derivatives in lubricants is further illustrated by the following specific examples:

A. SAE 90 gear lubricant _____ 92.0
    Product of Example 1 _____ 8.0
B. SAE 90 gear lubricant _____ 96.0
    Product of Example 2 _____ 4.0
C. SAE 90 gear lubricant _____ 94.0
    Product of Example 3 _____ 6.0
D. SAE 90 gear lubricant _____ 98.0
    Product of Example 4 _____ 2.0
E. SAE 90 gear lubricant _____ 95.0
    Product of Example 1 _____ 5.0
F. SAE 90 gear lubricant _____ 95.3
    Product of Example 2 _____ 4.7
G. SAE 90 gear lubricant _____ 96.6
    Product of Example 5 _____ 3.4
H. SAE 80 gear lubricant _____ 90.0
    Product of Example 3 _____ 10.0

The above gear lubricants may contain, in addition to the above specified additive, other substances which will impart desirable properties to the finished lubricant. Examples of such substances include oxidation inhibitors, extreme pressure agents, rust inhibitors, oiliness agents, etc.

To provide satisfactory protection against the ravages of extreme pressure it is desirable to incorporate into a lubricant at least about 1.0 percent of the metal-containing compositions described previously. Amounts up to 20 percent and even more are also useful. In most cases an optimum concentration is available from within the range of 3–10 percent by weight, based on the lubricating composition.

The utility of high concentration; i.e., up to 90 percent or higher, likewise is established by the convenience imparted to the problems and expense of transportation and storage. Such highly concentrated compositions, commonly termed "concentrates" in the trade, may then be diluted with lubricating oil at the destination point so as to provide finished lubricants containing the desired amount of metal-containing compositions of this invention.

The increase in horsepower of automotive engines has placed a corresponding increase of burden on the gear surfaces of axle units. Such a situation has enhanced to a considerable degree the utility of the hereindescribed composition. It has also pointed up the desirability and utility of combinations of various lubricant additives in which the products of this invention are useful. Such combinations as are particularly desirable include specifically the combination of any of the products of the examples herein plus a sulfur-containing organic compound which contains a sulfide linkage. The sulfide linkage contains preferably in addition to the sulfur atom(s) of the linkage, one or more sulfur atoms attached to one of these "linkage" sulfur atoms. Such a compound is illustrated by the structural formula

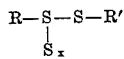

where R and R′ are the same or different organic radicals and $x$ is any integer, preferably from 1 to 3.

Specific examples of lubricants which contain the above combination of additives are as follows:

I. Midcontinent SAE 90 oil
   5% of the product of Example 1
   2% of benzyl pentasulfide
J. Midcontinent SAE 90 oil
   4% of the product of Example 2
   1% of butyl tetrasulfide
K. Midcontinent SAE 90 oil
   4% of the product of Example 3
   1.5% of butyl tetrasulfide
L. Midcontinent SAE 80 oil
   6% of the product of Example 4
   3% of chlorobenzyl pentasulifide
M. Midcontinent SAE 90 oil
   10% of the product of Example 2
   5% of benzyl tetrasulfide
N. Midcontinent SAE 80 oil
   5.5% of the product of Example 5
   2.7% of mixed benzyl tetrasulfide and pentasulfide It will be noted that the combination of ingredients (products of this invention plus polysulfides) may amount to as much as 15% by weight of the lubricant composition. Generally it is also advisable that at least 3–5% of this combination be used in an effective gear lubricant.

A more particular definition of the amounts of ingredients which may be incorporated in the novel gear lubricants may be based on the phosphorus content and the active sulfur content which is imparted to the finished lubricant. Thus the amounts of ingredients should be such that (a) from about 0.20 to about 0.75% by weight of phosphorus, and
(b) from about 0.25 to about 1.25% by weight of active sulfur are imparted to the lubricant by these two additives.

The term "active sulfur" is intended to denote that portion of sulfur within a molecule which, by virtue of its mode of attachment to other atoms, has a relatively high degree of reactivity. Such sulfur can be characterized in terms of its mode of attachment in that it is thought to be attached only to other sulfur atoms. That is, a sulfur which is attached only to other sulfur atoms is said to be "active sulfur" whereas sulfur atoms which are bound to atoms other than sulfur are not "active sulfur."

Such sulfur atoms may be said to be bonded only by secondary valence bonds.

It should be noted that where a sulfur atom is bound both to another sulfur atom and to an atom other than sulfur, such a sulfur atom is not active.

"Active sulfur" atoms are illustrated by (S) in each of the following structural formulae:

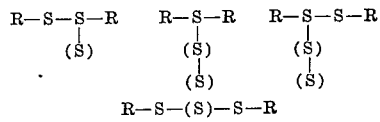

It is apparent that the amount of such a compound which is used in a lubricating composition can be expressed conveniently in terms of the amount of this active sulfur. Furthermore, inasmuch as it is the active sulfur content of these compounds which characterize their performance, such a means of defining the amounts in which they may be used is particularly appropriate.

What is claimed is:
1. A lubricating composition consisting essentially of a mineral lubricating oil and from about 1% to about 20% by weight of a phosphorus- and sulfur-containing material prepared by the process which comprises the reaction of a metal salt of a phosphorothioic acid having the structure

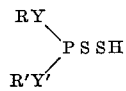

where R and R′ are organic radicals having from one to about 30 carbon atoms and are selected from the class consisting of alkyl, cycloalkyl, aryl, aralkyl, alkaryl, alkenyl and cycloalkenyl radicals, each bound to the rest of the molecule through a carbon atom, and Y and Y′ are selected from the class consisting of oxygen and sulfur, said metal being selected from the class consisting of aluminum, lead, molybdenum, and cadmium, with at least about 0.5 equivalent of an epoxide selected from the class consisting of epoxy alkanes, epoxy lower alkenes, epoxy alkyl carboxylic acids and styrene oxide at a temperature within the range of 0–200° C.

2. The lubricating composition of claim 1 characterized further in that the phosphorothioic acid is a dialkyl phosphorodithioic acid.

3. A lubricating composition consisting essentially of a mineral lubricating oil and from about 1% to about 20% by weight of a phosphorus- and sulfur-containing material prepared by the process which comprises the reaction of lead di(4-methyl-2-pentyl)phosphorodithioate with one equivalent of propylene oxide at a temperature within the range of 0–200° C.

4. A lubricating composition consisting essentially of a mineral lubricating oil and from about 1% to about 20% by weight of a phosphorus- and sulfur-containing material prepared by the process which comprises the reaction of lead di(2-ethylhexyl)phosphorodithioate with one equivalent of propylene oxide at a temperature within the range of 0–200° C.

References Cited by the Examiner
UNITED STATES PATENTS

| | | | |
|---|---|---|---|
| 2,346,155 | 4/44 | Denison et al. | 252—32.7 |
| 2,734,865 | 2/56 | Peeso et al. | 252—32.7 |
| 2,739,123 | 3/56 | Kennerly et al. | 252—32.7 |
| 3,004,996 | 10/61 | Arakelian et al. | 252—46.4 |

FOREIGN PATENTS

| | | |
|---|---|---|
| 628,744 | 10/61 | Canada. |
| 796,181 | 6/58 | Great Britain. |
| 819,169 | 8/59 | Great Britain. |

DANIEL E. WYMAN, *Primary Examiner.*